United States Patent Office 3,340,222
Patented Sept. 5, 1967

3,340,222
HYDROFLUOROCARBON POLYMER FILM-FORMING COMPOSITION
James C. Fang, Springfield, Pa., assignor to E. I. du Pont de Nemours and Company, Wilmington, Del., a corporation of Delaware
No Drawing. Filed June 28, 1963, Ser. No. 291,279
5 Claims. (Cl. 260—41)

This invention relates to a new and useful pigmented liquid film-forming composition containing a hydrofluorocarbon polymer (a polymer having both hydrogen and fluorine atoms attached to the carbon atoms of the principal carbon-to-carbon chain). The invention also relates to unsupported films and coated articles made from the novel composition.

Preferred embodiments of the novel composition have extraordinary utility for providing sheet metal and other substrates with an adherent and durable protective coating which has good rention of color, gloss and durability on exposure to elevated temperatures and to all kinds of weather.

The industries which manufacture building panels and other articles from sheet metal for outdoor use are in need of a better pigmented organic coating for these articles. The pigmented organic coatings provided by the prior art leave much to be desired in their capacity to retain their appearance and to protect the substrate during prolonged exposure to the weather and to other harmful environments. Moreover, many applications require that the sheet-metal product be bent or cut to its final shape or size after the coating has been applied; in these applications the prior art coatings have additional shortcomings. For example, the coatings which are hard enough to be non-tacky and resistant to abrasive damage in subsequent operations tend to suffer undue cracking, peeling or chipping during the final shaping operations. The coatings that are soft and flexible enough not to crack or ship during cutting and bending of the coated material tend to be too tacky during preparation and storage of the coated material in roll form and too easily marred during subsequent shaping operations.

Polyvinylidene fluoride and other hydrofluorocarbon polymers are known which have a high level of weather resistance, elasticity, mar resistance and toughness. It would therefore appear that a superior sheet-metal finish would result from coating the metal with a composition consisting of a dispersion in a volatile liquid of polyvinylidene fluoride or an equivalent hydrofluorocarbon polymer and a pigment having high hiding power such as titanium dioxide or a blend thereof with pigments of other colors. But when such a coating is baked at the temperature and time necessary to obtain satisfactory adhesion and coalescence of the coating (for example, at 510° F. for upwards of 70 second—see the Example 1 control sample), the results are quite unsatisfactory. For example, the coating is badly discolored after the baking step; and when exposed to the weather it readily loses its ability to protect the substrate and becomes very dull and discolored in appearance.

Expressed broadly, the liquid film-forming composition of this invention is comprised of a dispersion in a volatile liquid of (A) a hydrofluorocarbon polymer,
(B) an inorganic pigment, and
(C) absorbed on the pigment, a polymer that is free of fluorine atoms and epoxide groups. Polymer (C) preferably contains at least one member selected from the class consisting of ester, ether, ketone, carboxylic acid, hydroxyl and amide groups.

Polymer component C is sometimes referred to herein as the "fluorine-free polymer." The weight ratio of the fluorine-free polymer to the hydrofluorocarbon polymer (C:A) should be about 50:50 to 0.1:99.9.

"Dispersion" is used in the generic sense to include compositions wherein the film-forming polymer is present as a solution in the volatile liquid and those wherein it is present as very fine particles dispersed in the volatile liquid. "Volatile" designates the capacity of the liquid to volatilize at a temperature below the decomposition temperature of the film-formers present in the composition.

The hydrofluorocarbon polymer can be present as a solution in a volatile organic solvent or as a dispersion of very fine particles of the polymer in either a volatile organic latent solvent (organosol composition) or water (latex composition). "Latent solvent" designates a solvent having no significant solvent or swelling action on the hydrofluorocarbon polymer at room temperature but having sufficient solvent action to cause particles of said polymer to coalesce at an elevated temperature below the normal boiling point of the solvent. The most advantageous results are obtained with the solution and organosol compositions.

Any hydrofluorocarbon polymer can be used in practicing this invention. The molecular weight of the polymer, of course, is selected to fit the intended application in accordance with well known principles related to solubility, viscosity, toughness, hardness and the like.

Among the useful hydrofluorocarbon polymers are polyvinyl fluoride (e.g. as described in U.S. Patents 2,419,010 and 2,510,783), polyvinylidene fluoride (e.g. as described in U.S. Patent 2,435,537), vinyl fluoride copolymers (e.g. as described in U.S. Patent 2,935,818, Column 3), and vinylidene fluoride copolymers (e.g. as described in U.S. Patents 2,468,054 and 2,970,988). To illustrate, the copolymer can be a vinyl fluoride:vinylidene fluoride copolymer or a copolymer of either vinyl fluoride or vinylidene fluoride with at least one other halogen-substituted ethylenically unsaturated hydrocarbon comonomer. Especially useful copolymers in this class are terpolymers in which the third comonomer is an alkyl acrylate, alkyl methacrylate or bis-(2-chlorethyl)vinyl phosphonate. The preferred copolymers have a vinyl fluoride or vinylidene fluoride content of at least 50 weight percent.

As is known in the art, it is often necessary to use a hot solvent in order to form a solution of a hydrofluorocarbon polymer. The useful solvents are exemplified by dimethylformamide, tetramethylene sulfone, nitroparaffins, cyclohexanone, dibutyl ketone, mesityl oxide, aniline, phenol, methyl benzoate, phenyl acetate and diethyl phosphate. The following illustrate useful latent solvents in which various particulate hydrofluorocarbon polymers can be dispersed and subsequently coalesced by heating: butadiene cyclic sulfone, tetramethylenesulfone, dimethylsulfolane, hexamethylenesulfone, diallysulfoxide, dimethylsulfoxide, dicyanobutene, adiponitrile, ethylene carbonate, propylene carbonate, 1,2-butylene carbonate, 2,3-butylene carbonate, isobutylene carbonate, trimtheylene carbonate, N,N-diethylformamide, N,N-dimethylacetamide N,N-dimethylformamide, N,N-dimethyl-gamma-hydroxyacetamide, N,N-dimethyl-gamma-hydroxybutyramide, N,N-dimethylacetamide, N,N-dimethylmethoxyacetamide, N-methylacetamide, N-methylformamide, N,N-dimethylaniline, N,N-dimethylethanolamine, 2-piperidone, N-methyl-2-piperidone, N-methyl-2-pyrrolidine, N-ethyl-2-pyrrolidone, N-isopropyl-2-pyrrolidone, 5-methyl-2-pyrrolidone, beta-propiolactone, delta-valerolactone, gamma-valerolactone, alpha-angelicalactone, beta-angelicalactone, epsilon-caprolactone, and alpha,beta and gamma-substituted alkyl derivatives of gamma-butyrolactone, gamma-valerolactone and delta-valerolactone, as well as delta-substituted alkyl derivatives of delta-valerolactone, tetramethyl urea, 1-nitropropene, 2-nitropropane, acetonyl acetone, acetophenone, acetyl acetone, cyclohexanone, diacetone alcohol, dibutyl ketone, isophorone, mesityl oxide, methylamyl ketone, 3-methylcyclohexanone, bis-(methoxymethyl)uron, methylacetylsalicylate, diethyl phosphate, dimethyl phthalate, ethyl acetoacetate, methyl benzoate, methylene diacetate, methyl salicylate, phenyl acetate, triethyl phosphate, tris(morpholino)phosphine oxide, N-acetylmorpholine, N-acetylpiperidine, isoquinoline, quinoline, pyridine and tris(dimethylamido)phosphate.

The novel coating composition contains an inorganic pigment in a amount sufficient to give the coating, film or other article made from the composition the desired color and opacity. The most beneficial results are obtained when a major proportion of the pigment is composed to titanium dioxide. Rutile type titanium dioxide is preferred for coatings which should be resistant to chalking on exposure to the weather. Other pigments which can be used alone or in combination with titanium dioxide (preferably in combination) include silica, iron oxides of various colors, lead titanate, and various silicates, for example, talc, diatomaceous earth, asbestos, mica, clay and basic lead silicate. When using titanium dioxide and/or one or more of the other pigments just listed, films are obtainable having a particularly unexpected capacity to resist undesirable changes in color, gloss and durability on exposure to elevated temperatures and to the weather.

Other inorganic pigments which can be used in the novel composition, in combination with titanium dioxide, are illustrated as follows: zinc oxide, zinc sulfide, zirconium oxide, white lead, lithopone, carbon black, lead chromate, leafing and nonleafing metallic pigments, molybdate orange, calcium carbonate and barium sulfate. Because of the outstanding hiding power of titanium dioxide, coatings containing this pigment can be very thin and still have satisfactory opacity for many uses. Organic pigments which are stable at the baking temperatures used can also be added to the composition.

The novel composition should normally have a pigment volume concentration (volume of pigment based on the total volume of nonvolatile components) of about 5 to 40%, preferably about 15 to 30%, in order to provide a satisfactory balance of opacity, toughness and weather resistance. Slightly less than 5% can be used, for example, in a primer coat; and slightly over 40% can be used, for example, when the film is employed in an area sheltered from the weather or when the film is applied to a substrate subsequent to shaping operations. Over 30%, for example 31–36%, is sometimes preferred when the application requires a low-gloss coating.

The film-forming composition contains a fluorine-free polymer as defined above. Such a polymer is preferentially adsorbed by the pigment. At least part of the fluorine-free polymer in the completed liquid composition is adsorbed on the inorganic pigment. Thus, an extremely thin layer of the fluorine-free polymer molecules is in adherence with the surface of the pigment particles.

The fluorine-free polymer is added to the composition in an amount sufficient to give a fluorine-free polymer/hydrofluorocarbon polymer weight ratio of about 50:50 to 0.1:99.9. When the ratio is greater than about 50:50, the advantageous characteristics of the resulting films due to the presence of the hydrofluorocarbon polymer are unduly diminished. A ratio of about 33:67 to 3:97 is usually preferred when using the preferred pigments in the preferred proportions as described above. One skilled in the art will readily be able to select the best ratio to use with a particular pigment by varying the ratio in direct proportion to the pigment volume concentration and the pigment surface area. It is usually best to use at least the maximum amount of the fluorine-free polymer that is preferentially adsorbed by the pigment, but beneficial results are obtainable with less than this amount. When the composition contains more than the maximum amount of fluorine-free polymer that the pigment can adsorb, the excess can be separated from the pigment by a conventional centrifuge-separation method.

Polymers which are specially useful as the fluorine-free polymer include polymers containing a substantial proportion, preferably a major proportion, of an alkyl acrylate, an alkyl methacrylate or a blend thereof. Maximum retention of color and gloss on baking and weathering is usually obtained with these acrylic ester polymers. Also useful are other polymers containing ester groups, for example, alkyd resins, vinyl ester polymers such as polyvinyl acetate and polymers of vinyl dioxolanes such as (2-vinyl-1,3-dioxolane-4-butyl) orthophthalate. Also useful are fluorine-free polymers containing ether groups, for example, polyalkyleneether glycols; polyvinyl butyral ether, and polyvinyl alkyl ethers; polymers containing carboxylic acid groups, for example, ethylenemethacrylic acid copolymers, isobutylene-maleic acid copolymers and styrene itaconic acid copolymer; polymers containing ketone groups, for example, ethylene-carbon monoxide copolymers as described in U.S. Patent 2,495,285, polyacrolein and methyl vinyl ketone polymer; polymers containing hydroxyl groups, for example polyvinyl alcohol, styrene-allyl alcohol copolymers and hydrolyzed ethylene-vinyl acetate copolymers; and polymers containing amide groups, for example, styrene-acrylamide copolymers and methyl methacrylate-methacrylamide copolymers. It is necessary to use a fluorine-free polymer that contains enough polar groups to enable it to become preferentially adsorbed on the pigment in the preparation of the novel composition. Satisfactory adsorption onto the pigment is not obtained with fluorine-free polymers containing none of the ester or other polar groups specified above. For example, polystyrene, polyisobutylene, polybutadiene, polyethylene and polypropylene are not useful as the fluorine-free polymer of the novel composition.

A preferred method of preparing the novel film-forming composition comprises the steps of (1) dispersing the hydrofluorocarbon polymer in a volatile liquid (as previously defined), (2) separately dispersing the fluorine-free polymer and the pigment in a volatile liquid which is miscible with the voltatile liquid used in step (1), and (3) mixing the dispersion resulting from step (2) with the dispersion resulting from step (1).

The composition can also be prepared by dispersing the pigment in a hydrofluorocarbon polymer dispersion followed by adding a fluorine-free polymer dispersion. Alternately, it can be prepared by mixing a hydrofluorocarbon polymer dispersion with a fluorine-free polymer dispersion and then dispersing the pigment in the mixture.

Methods well known in the art can be employed in the manufacture of coated sheet materials, unsupported films and other solid articles from the novel film-forming composition. For example, unsupported films can be made by applying a layer of the liquid composition to an adhesion resistant substrate that is removable from the film which results from drying and coalescing the layer of composition. Shrinkage and distortion of the film can be prevented by holding the edges in a frame or clamp during the drying and cooling steps. The composition can also be heated and extruded into a quenching liquid as taught in U.S. Patent 2,953,818. Or the liquid composition can be dried and the solid residue then fabricated into useful shapes by conventional extrusion and molding techniques. Also, filaments and fibers can be prepared from the composition by methods known in the art. Permanently coated sheet metal can be made by applying a coating of metal surface, for example, by dipping, brushing, flow-coating, extruding, doctor-blading or rolling, and then drying the coating. With many of the hydrofluorocarbon polymers, the coating should be heated at an elevated temperature sufficient to complete the coalescence of the coating, for example, at about 300 to 600° F. The metal substrate should first be cleaned, abraded, passivated or otherwise prepared in accordance with known methods for promoting the adhesion of protective coatings.

The film-forming composition can also be used for applying adherent durable coatings to a wide variety of other substrates, for example, wood, masonry, composition wall-boards, leather, plastic, paper, nonwoven fabrics and woven fabrics.

The novel composition is especially useful for the application of adherent and durable pigmented, protective and decorative coatings on long sheets (strips) of aluminum, steel and other metals, which coated sheets are subsequently cut and shaped into useful articles by conventional sheet-metal fabrication methods. The coating of such sheets is commonly referred to in the art as "stripcoating," and the fabrication after application of the coating is called "postforming." The strip-coated sheets are especially useful for the manufacture of weather-resistant panels for use on the exterior surfaces of buildings.

Stripcoated metal sheets are obtainable in accordance with this invention which have the following advantages over metal sheets coated with pigmented hydrofluorocarbon polymer coating compositions that have none of the previously described fluorine-free polymer adsorbed on the pigment:

(a) Less discoloration after a baking cycle which gives best adhesion and coalescence of the coating; also, after exposure to high temperature use conditions.

(b) Better postforming durability of the coating (resistance to damage by bending, pounding, abrading, etc.) after a baking cycle which gives best adhesion and coalescence of the coating.

(c) After prolonged exposure to the weather, better color, gloss and coating durability.

Similar advantages are obtainable in other articles made from the novel composition, such as unsupported (self-supporting) films and sheets, molded articles, coated wood and coated fabrics. The unsupported films have advantageous utility for hot-press lamination to sheet-metal and other substrates.

The examples which follow are given for the purpose of illustrating the invention. All quantities shown are on a weight basis unless otherwise indicated.

EXAMPLE 1

A coating composition for use in the manufacture of stripcoated postformable sheet metal is prepared by mixing 10 parts of a pigmented acrylic copolymer solution with 20 parts of a polyvinylidene fluoride organosol. The pigment acrylic composition has the following formula:

*Formula A*

| | Parts by weight |
|---|---|
| Acrylic copolymer [1] | 7.4 |
| Ester solvent [2] | 8.1 |
| Aromatic solvent [3] | 24.5 |
| Titanium dioxide, rutile | 60.0 |
| | 100.0 |

[1] A 56.0 : 43.5 : 0.5 copolymer of methyl methacrylate, ethyl acrylate and methacrylic acid.
[2] A solvent of the formula $CH_3COOCH_2CH_2OC_2H_5$ ("Cellosolve" acetate).
[3] A mixture of aromatic hydrocarbons which boils in the range of 189 to 219° C.

The pigment is dispersed in the copolymer solution by a sand-grinding process of the type described in U.S. Patent 2,581,414.

The organosol is composed of a 45% dispersion of polyvinylidene fluoride in the form of very fine particles in a latent solvent composed of an 80:20 blend of dimethyl orthophthalate and diisobutyl ketone.

A long strip of 25 mil thick sheet aluminum which has previously been cleaned and chromated by a conventional prepaint process is unwound from a storage roll and roller-coated on the top surface with a one mil coating (dry-film thickness) of the resulting coating composition. The coated material is passed through a heat zone where the coating is subjected to an air temperature of 510° F. for 72 seconds. Then it is cooled to room temperature and rolled up on a storage roll to await fabrication into shaped articles. The resulting stripcoated material is useful for the manufacture of exterior building panels by postforming to the desired shape.

The coated side of the product of Example 1 has a clean white color, with no apparent yellowing. A separate sample of the freshly coated non-baked material is baked at 510° F. for 180 seconds; this sample is also free of any apparent yellowing.

A sample of coated material is made from a coating composition outside the scope of the present invention ("control sample") for comparison with the product of Example 1. The control sample is made by repeating Example 1 except the acrylic copolymer is replaced with polyvinylidene fluoride; this sample shows some yellowing of the coating after the 72 second bake and much yellowing after the 180 second bake.

The Delta E Value of the Example 1 product baked for 72 seconds is 1.50 and the Example 1 material baked for 180 seconds has a Delta E Value of 1.86. The Delta E Value of the control sample baked for 72 seconds is 6.28 and that of the control sample baked for 180 seconds is 14.93.

"Delta E Value" is a means known in the art for expressing total color difference from pure white. Magnesium oxide is the absolute white standard. The value is measured by a spectrophotometric tristimulus technique as described on page 881 of the A.S.T.M. Manual published in 1961, Method No. D–1482–57–T. The value is obtained by computation of color coordinate and color differences bases on a modified Adams chromatic value equation. The values given above were calculated on a Bendix computer. A difference in Delta E Value of about 0.5 can be noted with the unaided eye on close examination of the material; a difference of 2 or more is very noticeable without close examination.

In the product of Example 1, the adhesion of the coating to the substrate is entirely satisfactory after the 72 second bake. When fine criss-cross cuts are made in the coating with a sharp knife and a pressure-sensitive cellophane adhesive tape is applied over the cut area followed by removal of the tape, substantially no coating is removed by the tape. When the control sample described above which was baked for 72 seconds is tested in this manner, the adhesion of the coating is unsatisfactory as evidenced by removal of much of the coating in the tape-tested area. Although the adhesion of the coating on the control sample baked for 180 seconds is quite good, the material is far inferior to the Example 1 product both in color and in weather resistance.

The weather resistance of the Example 1 product is compared with that of the control sample by placing test panels of both materials baked at both 72 seconds and 180 seconds in a conventional accelerated weathering machine wherein the coating is subjected intermittently to a spray of water and to the actinic light of a sun lamp. After 500 hours in the weathering machine the Example 1 panels are about as bright and glossy as before the test whereas the control panels are extremely dull and chalky in appearance. When the Example 1 panels are returned to the weathering machine for another 500 hours, they still show substantially no change in appearance.

The Example 1 product has excellent capacity to withstand postforming operations. Test panels of the material are subjected to conventional sheet-metal forming operations wherein the material is cut with shears, shaped in stamping dies and given a 180 degree bend. The coating on each of the postformed panels is substantially free of apparent damage.

The Example 1 coating composition is useful for coating articles which are to receive some use at elevated temperatures of up to about 400° to 500° F.

EXAMPLE 2

A stripcoated sheet-metal product having advantages and utility similar to the product of Example 1 is manufactured as follows:

Example 1 is repeated except the aluminum substrate is replaced with cleaned and phosphated galvanized steel sheet material having a 37 mil thickness.

The product has a unique combination of useful properties since the coating is (a) Hard enough to be non-tacky and mar resistant during rolling, unrolling and postforming operations, (b) Flexible and adherent enough to resist cracking, peeling and chipping during such operations, and (c) Capable of retaining good gloss and color during preferred baking conditions and when exposed to the weather.

EXAMPLE 3

Example 1 is repeated except the pigmented acrylic composition contains only 0.036 part instead of 7.4 parts of acrylic copolymer. The resulting coating composition contains only 0.06% of acrylic copolymer based on the weight of titanium dioxide present instead of the 12.3% used in Example 1. And the weight ratio of the acrylic copolymer to the polyvinylidene fluoride in the composition is only about 0.4:99.6 instead of the 7.6:92.4 ratio of Example 1. The composition of this example is useful for providing metal articles with a durable and weather-resistant protective coating. The coating is noticeably whiter when baked for 72 seconds at 510° F. and much whiter when baked for 120 seconds at 510° F. than a control coating of the same composition except no acrylic copolymer is present.

EXAMPLE 4

Long sheets of aluminum and galvanized steel in roll form as described in Examples 1 and 2 are roller-coated on one surface with a one mil coating (dry-film thickness) of a white coating composition prepared as follows:

One hundred parts of the pigmented acrylic copolymer solution described in Example 1 (Formula A) are mixed with 290 parts of a hydrofluorocarbon polymer solution composed of 180 parts of methyl ethyl ketone, 20 parts of dimethyl orthophthalate and 90 parts of a 79:19.6:1.4 copolymer of vinylidene fluoride/tetrafluoroethylene/bis-(2-chloroethyl)vinyl phosphonate. The latter copolymer is prepared as described in Example 25 of copending U.S. patent application S.N. 286,470 filed in the name of F. B. Stilmar on June 10, 1963 and entitled "Composition of Matter."

The coated sheets of metal are passed through a heat zone where the coating is subjected to an air temperature of 450° F. for 72 seconds. Then the coated sheets are cooled to room temperature and rolled up on a storage roll to await shaping operations.

The coated side of the product of Example 4 has a white color that is free of any apparent yellowing. A separate sample of the coated non-baked material is baked at 450° F. for 120 seconds; this sample is also free of any apparent yellowing after baking. A control sample made by repeating Example 4 except the acrylic copolymer is replaced with the Example 4 hydrofluorocarbon polymer shows much yellowing of the coating after the 120 second bake.

In the product of Example 4, the adhesion of the coating to the substate is entirely satisfactory after the 72 second bake as indicated by the tape test described in Example 1.

The weather resistance of the Example 4 product is compared with that of the control sample by placing test panels of both materials baked at 72 seconds, 450° F. in the accelerated weathering machine described in Example 1. After 2000 hours in the weathering machine the Example 4 panels still have bright white and glossy coatings whereas the coatings on the control panels are very dull and chalky in appearance.

The Example 4 product is also highly resistant to damage by postforming operations.

EXAMPLE 5

To 195 parts of the white coating composition described in Example 4 are added 9.75 parts of a blue pigment dispersion having the following formula:

Formula B

| | Parts by weight |
|---|---|
| Acrylic copolymer of Formula A | 23.7 |
| Ester solvent of Formula A | 16.3 |
| Aromatic solvent of Formula A | 48.9 |
| Phthalocyanine blue pigment | 11.1 |
| | 100.0 |

The pigment is dispersed in Formula B by a sand-grinding process as described in U.S. Patent 2,581,414.

Sheets of aluminum and galvanized steel as described in Examples 1 and 2 are roller-coated on one surface with a one mil coating (dry-film thickness) of the resulting blue coating composition, followed by a 72 second bake at 450° F. and cooling at room temperature. Coating adhesion is good and there is no discoloration of the coating during baking.

A control sample is made by repeating Example 5 except the acrylic copolymer of Formulas A and B is replaced with the Example 4 hydrofluorocarbon polymer. Next, the weather resistance of the Example 5 product is compared with that of the control sample by placing the test panels in the accelerated weathering machine described in Example 1. After 2000 hours in the weathering machine the Example 5 panels still have brilliant blue and glossy coatings whereas the coatings on the control panels are badly faded, dull and chalky in appearance.

The Example 5 product is also highly resistant to damage by postforming operations.

EXAMPLE 6

A sheet of aluminum as described in Example 1 is roller-coated on one surface with a one mil coating (dry-film thickness) of a white coating composition prepared by mixing 10 parts of the Formula A composition of Example 1 with 24 parts of a composition having the following formula:

Formula C

| | Parts by weight |
|---|---|
| Polyvinyl fluoride | 80 |
| Dimethyl acetamide | 120 |
| Gamma butyrolactone | 90 |
| Titanium dioxide, rutile | 40 |
| | 330 |

The pigment is dispersed in the polyvinyl fluoride organosol by sand grinding.

The coating is baked for 72 seconds at 510° F., followed by cooling at room temperature. Coating adhesion is good, and the color is nearly as white as before baking. The coating has a Delta E Value of 2.23.

A control sample is made by repeating Example 6 except the coating composition consists of Formula C (none of the Formula A acrylic composition is added). There is much discoloration (yellowing) of the coating during the 72 second bake. The coating has a Delta E Value of 8.96.

EXAMPLE 7

A sheet of aluminum as described in Example 1 is roller-coated on one surface with a one mil coating (dry-film thickness) of a white coating composition prepared by mixing 4.5 parts of a solution consisting of 1.8 parts of polymethyl methacrylate dissolved in 2.7 parts of xylene with 23 parts of a pigmented organosol composition having the following formula:

*Formula D*

| | Parts by weight |
|---|---|
| Polyvinylidene fluoride organosol of Example 1 | 638.0 |
| Dimethyl orthophthalate | 100.0 |
| Titanium dioxide, rutile | 172.4 |
| | 910.4 |

The pigment is dispersed in the Formula D composition on a 3-roll mill.

The coating is baked for 120 seconds at 510° F., followed by cooling to room temperature. Coating adhesion is good and the color appears nearly as white as before baking.

A control sample is made by repeating Example 7 except the coating composition consists of Formula D; none of the polymethyl methacrylate solution is added. There is much discoloration (yellowing) of the coating during the 120 second bake.

EXAMPLE 8

Example 7 is repeated except the polymethyl methacrylate solution is replaced individually by each of the materials shown in Table I.

TABLE I (a) 4.5 parts of a solution consisting of 1.8 parts of polyethyl acrylate dissolved in 2.7 parts of xylene.
(b) 1.8 parts of polyethyleneether glycol, molecular weight 400.
(c) 1.8 parts of coconut oil modified alkyl resin dissolved in 1.2 parts of xylene. The alkyl resin is a 37% oil-length coconut oil-modified glyceryl phthalate alkyl resin having an acid number of about 6 and a content of unesterified hydroxyl groups equivalent to about 5.4% of glycerol.
(d) 1.8 parts of a copolymer of 4 moles ethylene and 1 mole carbon monoxide (a polyketone polymer) dissolved in 16.2 parts xylene. U.S. Patent 2,495,285 teaches the preparation of the copolymer.
(e) 1.8 parts of polyvinyl acetate dissolved in 7.2 parts xylene.

All five of the resulting coated sheet materials show much less discoloration (yellowing) of the coating during the 120 second bake than the control sample of Example 7. All 5 of the Example 8 coating compositions are useful for providing metal substrates with adherent and durable protective coatings of satisfactory appearance. Similar results are obtained when Example 8 is repeated except the replacement for polymethyl methacrylate is a copolymer of 50 moles of styrene and 50 moles of allyl alcohol. Similar results are also obtained when the fluorine-free polymer is a 95:5 copolymer of styrene and acrylamide (1.25% acrylamide by weight of polyvinylidene fluoride in the composition), or a 90:10 copolymer of styrene and itaconic acid.

EXAMPLE 9

A self-supporting film of pigmented polyvinyl fluoride is produced as follows: A film-forming organosol composition is prepared having the following formula:

*Formula E*

| | Parts by weight |
|---|---|
| Acrylic copolymer [1] | 1.3 |
| Dimethyl acetamide | 57.0 |
| Pigment [2] | 13.0 |
| Polyvinyl fluoride | 28.7 |
| | 100.0 |

[1] "Acryloid" B–82 from Rohm and Haas Company, believed to be a 50:50 copolymer of methyl methacrylate and ethyl acrylate.
[2] A 99.3:0.7 blend of rutile titanium dioxide and phthalocyanine blue.

The acrylic copolymer is introduced as a 35% solution in N,N-dimethylacetamide (DMA) into a container equipped with a stirrer, then the pigment is added with stirring in the form of a 54% dispersion in DMA, and finally the polyvinyl fluoride is added with stirring in the form of a 40% dispersion in DMA. The polyvinyl fluoride is present in the form of fine particles; it has an inherent viscosity of 3.0 as measured by the method described in U.S. Patent 2,953,818, column 6, line 75. The resulting composition is fed into the heated hopper of a melt extrusion apparatus substantially as illustrated and described in U.S. Patent 2,953,818, where it is heated until coalesced into a fluid single-phase composition and extruded from a 25 mil by 6 inch slot at the bottom of the hopper into a water bath maintained at about 50° F. at the rate of about 20 lbs. per hour. The slotted portion of the hopper is maintained at about 300° F. The draw-off rate of the quenched film is adjusted to produce a 17 mil thick film at the linear rate of about 7 feet per minute. Next, the film is passed through a heat zone adapted to heat the film to about 390° F., to remove some of the DMA solvent, and to soften it for stretching. Then the film is passed through a conventional 2-way film-stretching apparatus where it is oriented in 2 mutually perpendicular directions, and stretched enough to reduce the film thickness to 2 mils. Substantially all of the remaining dimethyl acetamide is volatilized in a current of warm air while the film is restained to prevent shrinking. The light blue film, which shows no discoloration, can be laminated to metal, wood and other substrates to form highly weather-resistant construction materials.

EXAMPLE 10

A white coating composition useful for providing exterior automobile parts and other metal articles with an adherent and durable protective coating having good initial appearance and retention of color, gloss and durability on exposure to elevated temperatures and to all kinds of weather is prepared as follows:

First, a pigmented acrylic polymer dispersion is made according to the following formula:

*Formula F*

| | Parts by weight |
|---|---|
| Acrylic copolymer solution [1] | 39.2 |
| Plasticizer, butyl benzyl phthalate | 1.9 |
| Antisettling agent [2] | 2.0 |
| Titanium dioxide, rutile | 56.9 |
| | 100.0 |

[1] A 25% solution of the product of reacting ammonia with a 98:2 copolymer of methyl methacrylate and glycidyl methacrylate, the solvent being a 33:44:23 blend of toluene, anhydrous isopropanol and xylene. The copolymer can be made by the method described in U.S. Patent 2,949,445 with slight obvious changes in the ratio of components.
[2] The product of mixing 50 parts of xylene with 50 parts of a 40% mineral spirits solution of what is understood to be a hydrogenation-modified castor oil paint additive (Baker Castor Oil Company M-P-A).

Next, a coating composition is prepared according to the following formula:

*Formula G*

| | Parts by weight |
|---|---|
| Formula F dispersion | 10.6 |
| Acrylic copolymer solution in Formula F | 7.9 |
| Hydrofluorocarbon solution [1] | 17.5 |
| | 36.0 |

[1] A 40% solution in methyl ethyl ketone of the vinylidene fluoride copolymer of Example 4.

Two coats of the Formula G coating composition are applied with a 10 mil doctor blade on one surface of automobile body steel which has been passivated in a phosphate conversion coating bath. Each coating is briefly air dried, then baked for 75 seconds at 450° F. The coated material is cooled by dipping it in water at 70° F. The coating, now 2.2 mils in thickness, has excellent gloss, hardness, white color, mar resistance, weather resistance and heat resistance; also, it is considerably more economical than a coating of the same composition except for the absence of the acrylic polymer.

EXAMPLE 11

A coating composition having utility similar to the coating composition of Example 1 is prepared according to the following formula:

*Formula H*

|  | Parts by weight |
|---|---|
| Acrylic copolymer of Formula A, 40% solution in the aromatic solvent of Formula A | 1.8 |
| Polyvinylidene fluoride organosol of Example 1 | 20.0 |
| Silica pigment, average particle size 11 microns | 5.4 |
| Diisobutyl ketone | 14.0 |
|  | 41.2 |

The pigment is dispersed in the organosol by sand grinding before adding the acrylic copolymer solution.

The Formula H composition has good resistance to discoloration when a coating thereof is baked at 510° F. for 120 seconds.

EXAMPLE 12

A coating composition having utility similar to that of the Example 1 coating composition is prepared according to the following formula:

*Formula I*

|  | Parts by weight |
|---|---|
| Acrylic copolymer solution in Formula H | 0.8 |
| Hydrofluorocarbon polymer solution [1] | 26.0 |
| Magnesium silicate pigment | 4.0 |
|  | 30.8 |

[1] A solution of 4 parts vinylidene fluoride/tetrafluoroethylene copolymer (80/20) in 22 parts gamma butyrolactone.

The pigment is dispersed in a mixture of the first two ingredients of Formula I by sand grinding.

The Formula I composition has good resistance to discoloration when a coating thereof is baked at 510° F. for 120 seconds.

I claim:
1. A liquid coating composition comprised of a dispersion in a volatile organic liquid of
    (A) a polymer selected from the class consisting of polyvinyl fluoride, polyvinylidene fluoride, copolymers of vinyl fluoride and vinylidene fluoride, copolymers of vinyl fluoride with other halogen-substituted ethylenically unsaturated monomers, and copolymers of vinylidene fluoride with other halogen-substituted ethylenically unsaturated monomers;
    (B) an inorganic pigment composed predominately of titanium dioxide, the pigment volume concentration, based on the total volume of non-volatile components, being about 5 to 40%, and
    (C) adsorbed on the pigment, a polymer a major proportion of which consists of a member of the class consisting of alkyl acrylate polymers, alkyl methacrylate polymers and copolymers of an alkyl acrylate and an alkyl methacrylate, the weight ratio of said polymer to the polymer in (A) being about 50:50 to 0.1:99.9.
2. The composition of claim 1 in which the polymer in (A) is polyvinyl fluoride and the polymer in (C) is an alkyl methacrylate polymer.
3. The composition of claim 1 in which the polymer in (A) is polyvinylidene fluoride and the polymer in (C) is an alkyl methacrylate polymer.
4. The composition of claim 2 in which the polymer in (C) is poly(methyl methacrylate).
5. The composition of claim 3 in which the polymer in (C) is poly (methyl methacrylate).

References Cited

UNITED STATES PATENTS

| 2,419,008 | 4/1947 | Coffman | 260—32.6 |
| 2,824,780 | 2/1958 | Satterthwaite | 260—34.2 |
| 2,963,340 | 12/1960 | Satterthwaite | 260—34.2 |
| 3,000,844 | 9/1961 | Bro | 260—32.6 |
| 3,054,761 | 9/1962 | Moore et al. | 260—900 X |
| 3,058,949 | 10/1962 | Coover | 260—32.6 |
| 3,211,687 | 10/1965 | Capron | 260—32.6 |
| 3,224,094 | 12/1965 | Exemplare | 260—900 X |

MORRIS LIEBMAN, *Primary Examiner.*

F. M. SIKORA, J. FROME, *Assistant Examiners.*